United States Patent

Wu

(10) Patent No.: US 6,363,835 B1
(45) Date of Patent: Apr. 2, 2002

(54) GRILL DEVICE HAVING SELF-ADJUSTABLE UPPER COOKING MEMBER TO ABUT AGAINST ENTIRE GRILLING SURFACE OF A MEAT PIECE

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/952,729

(22) Filed: Sep. 14, 2001

(51) Int. Cl.[7] .......................... A47J 37/00; A47J 37/06; A47J 37/08
(52) U.S. Cl. .......................... 99/331; 99/349; 99/353; 99/372; 99/375; 99/378; 99/379; 99/400; 99/425; 99/445; 99/446
(58) Field of Search .......................... 99/331–333, 349, 99/352, 353, 372–384, 400, 401, 425, 444–450; 219/401, 521, 524, 585, 525, 537, 386, 461, 415, 492, 494; 100/92, 305; 126/369, 20; 426/523, 520, 512

(56) References Cited

U.S. PATENT DOCUMENTS

| 3,880,064 | A | * | 4/1975 | Martinex | 99/349 |
| 4,972,766 | A | * | 11/1990 | Anetsberger | 99/332 |
| 5,473,976 | A | * | 12/1995 | Hermansson | 99/349 |
| 5,531,155 | A | * | 7/1996 | Pellicane et al. | 99/372 |
| 5,555,794 | A | * | 9/1996 | Templeton et al. | 99/349 |
| 5,655,434 | A | * | 8/1997 | Liebemann | 99/353 |
| 5,676,046 | A | * | 10/1997 | Taber et al. | 99/340 |
| 5,755,150 | A | * | 5/1998 | Matsumoto et al. | 99/372 |
| 5,771,782 | A | * | 6/1998 | Taber et al. | 99/385 X |
| 5,802,958 | A | * | 9/1998 | Hermansson | 99/379 X |
| 5,839,359 | A | * | 11/1998 | Gardener | 99/349 |
| 5,881,634 | A | * | 3/1999 | Newton | 99/379 X |
| 5,890,419 | A | * | 4/1999 | Moravec | 99/349 |

* cited by examiner

Primary Examiner—Timothy F. Simone
(74) Attorney, Agent, or Firm—Brinks Hofer Gilson & Lione

(57) ABSTRACT

A grill device includes a lower grill unit with a lower cooking member, and a frame pivoted to a rear side of the lower grill unit so as to be turnable rearwardly relative to the lower grill unit. The frame has two lateral arms defining therebetween a receiving space and confining the lower cooking member therebetween when the frame is at a closed position relative to the lower grill unit. An upper grill unit is disposed in the receiving space, is pivoted to the lateral arms of the frame so as to be turnable relative to the frame, has an upper cooking member which is registered with and which is electrically coupled to the lower cooking member of the lower grill units, and cooperates with the lower grill unit to confine a cooking space therebetween when the frame is at the closed position.

4 Claims, 5 Drawing Sheets

GRILL DEVICE HAVING SELF-ADJUSTABLE UPPER COOKING MEMBER TO ABUT AGAINST ENTIRE GRILLING SURFACE OF A MEAT PIECE

BACKGROUND OF THE INVENTION

1. Field of the Invention

The invention relates to a grill device, more particularly to a grill device which has a self-adjustable upper cooking member to abut against an entire grilling surface of a meat piece.

2. Description of the Related Art

Referring to FIG. 1, a conventional grill device 1 is shown to include a lower grill unit 12 with a lower cooking member (not visible), an upper grill unit 11 which is pivotally connected to the lower grill unit 12 and which has an upper cooking member (not visible) electrically coupled to the lower cooking member, and a control switch (not visible) for controlling actuation and cooking temperature of the upper and lower cooking members.

One disadvantage encountered during use of the aforesaid conventional grill device resides in that in case a relatively thick piece of meat is being grilled, the upper cooking member will tilt relative to the meat piece and some portion of the meat piece will be spaced apart from the upper cooking member and will not be properly grilled after the required grilling period.

SUMMARY OF THE INVENTION

The object of this invention is to provide a grill device with an upper grill unit that has a self-adjustable upper cooking member to eliminate the occurrence of the aforesaid disadvantage which results during use of the conventional grill device.

Accordingly, a grill device of the present invention includes a horizontal lower grill unit, a frame, a horizontal upper grill unit, and a control switch. The lower grill unit has a rear side and is provided with a lower cooking member. The frame is pivoted to the rear side of the lower grill unit and is movable rearward relative to the lower grill unit between a closed position, where the frame is superposed on a periphery of the lower grill unit, and an open position, where the frame is spaced apart from the lower grill unit. The frame has at least two parallel lateral arms defining therebetween a receiving space and confining the lower cooking member therebetween when the frame is at the closed position. The upper grill unit is disposed in the receiving space of the frame, and is pivoted to the lateral arms of the frame via two pivots so as to be turnable relative to the frame. The upper grill unit has an upper cooking member which is registered with and which is electrically coupled to the lower cooking member of the lower grill unit, and which cooperates with the lower grill unit to confine a cooking space therebetween when the frame is at the closed position. The control switch is operable so as to control actuation and cooking temperature of the lower cooking member of the lower grill unit and the upper cooking member of the upper grill unit.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
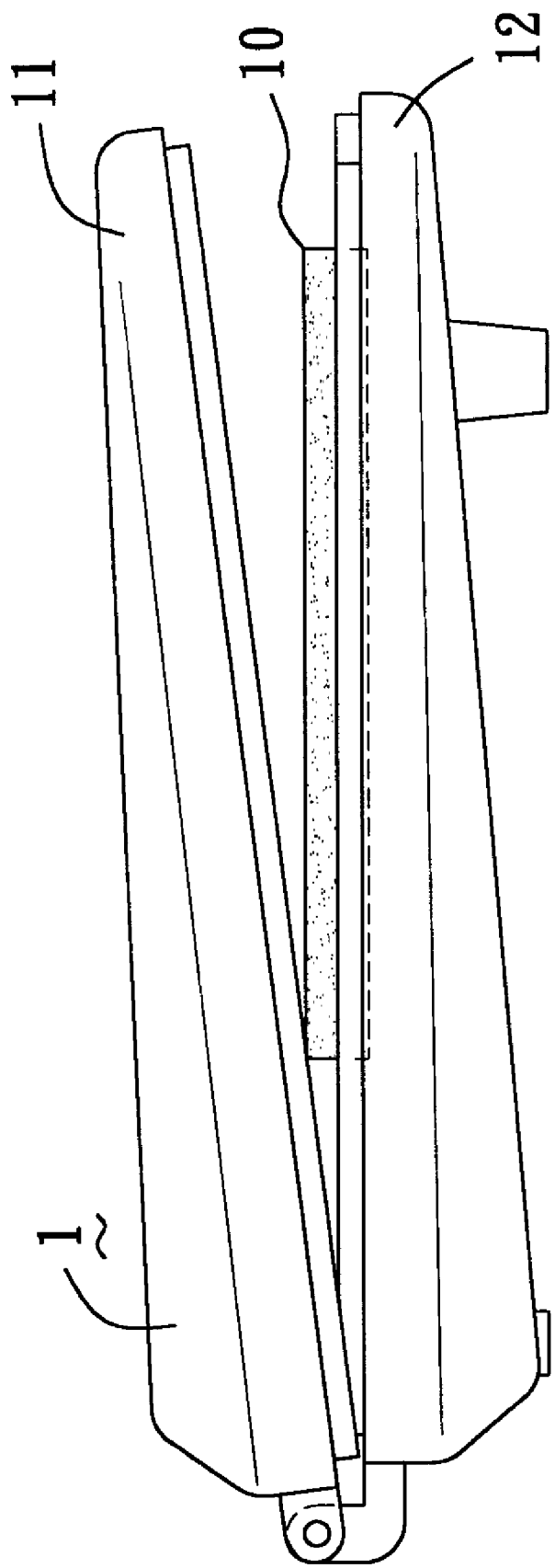
FIG. 1 is a schematic side view of a conventional grill device in use.
Figure 2:
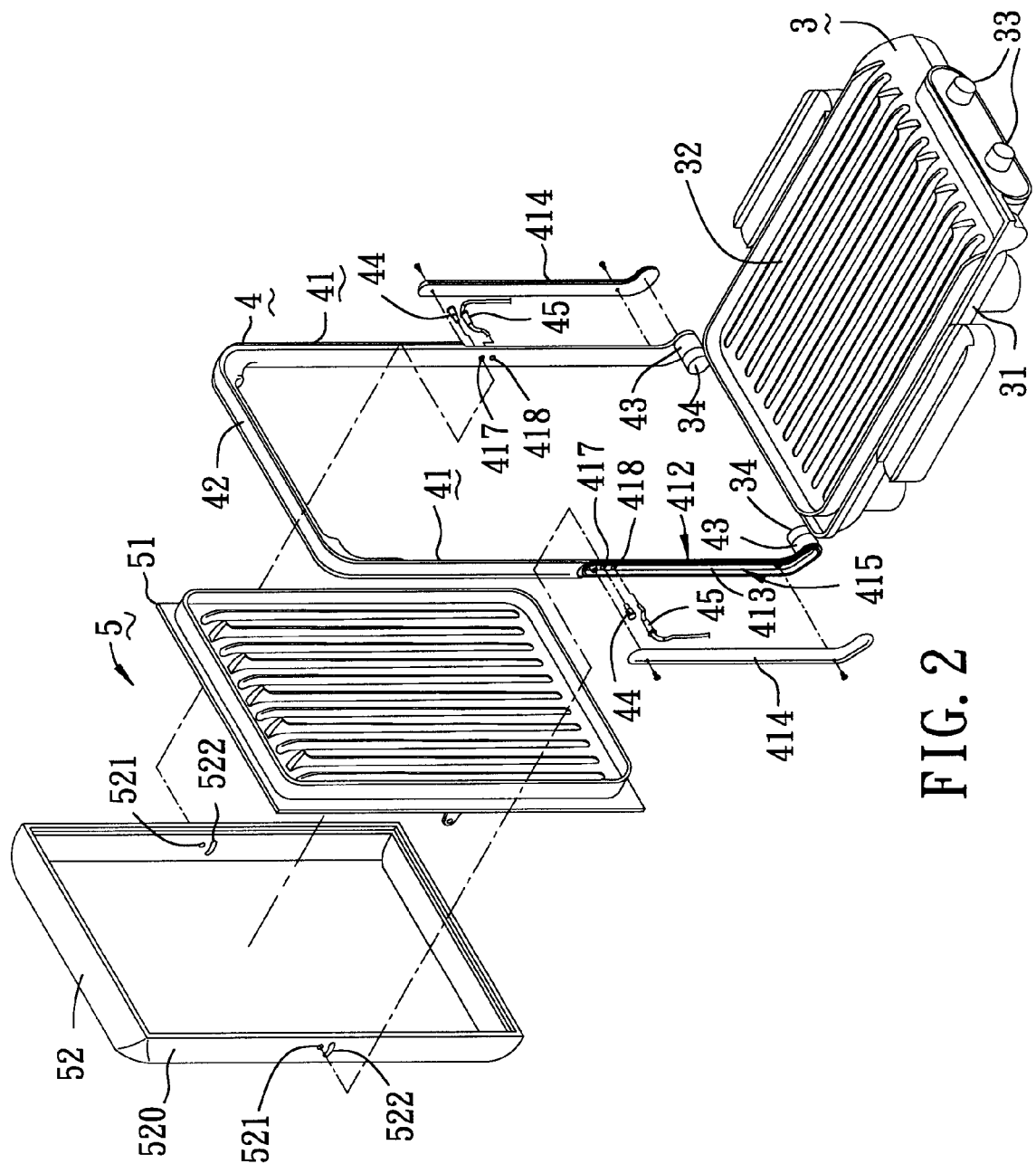
FIG. 2 is an exploded perspective view of a preferred embodiment of a grill device of the present invention.
Figure 3:
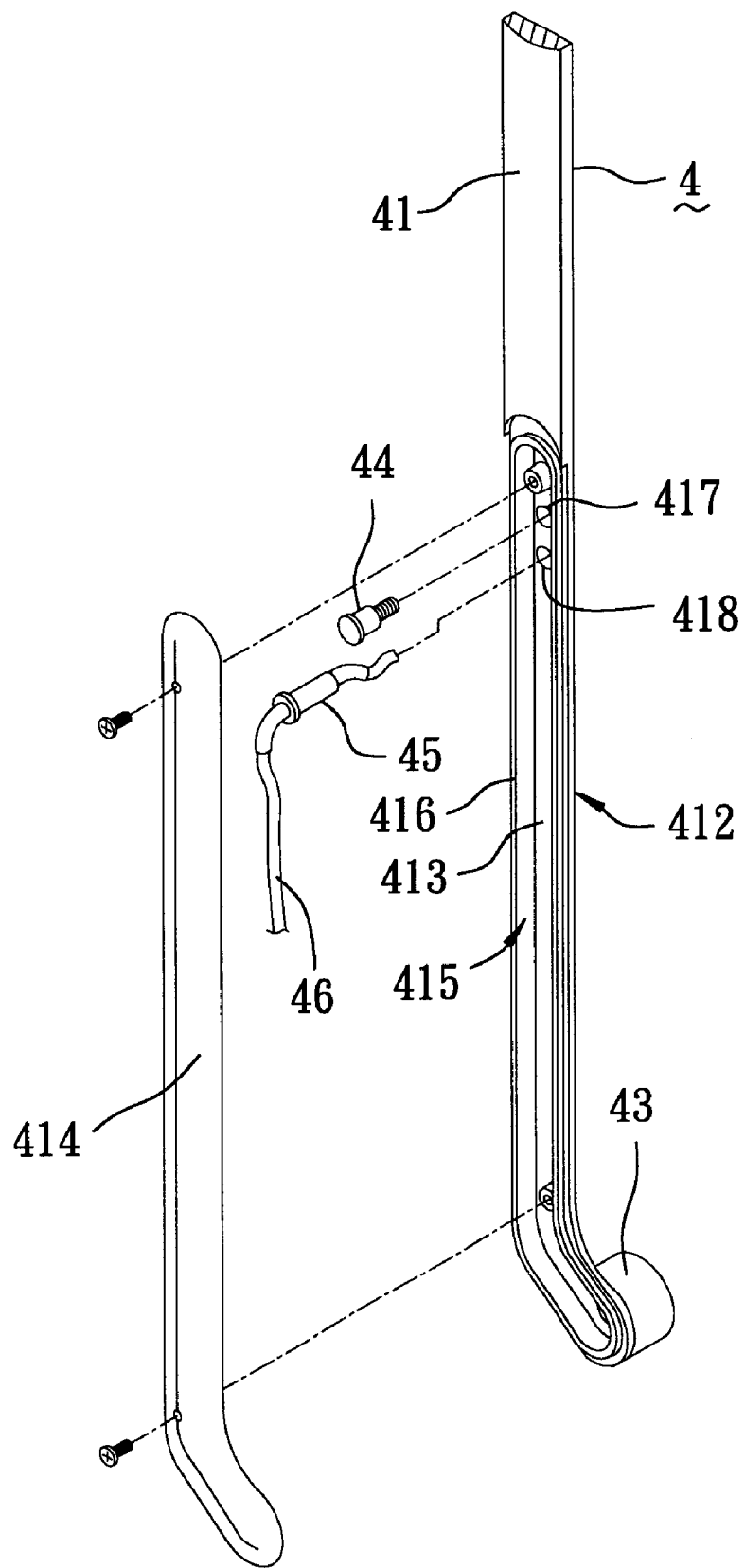
FIG. 3 is a fragmentary view of a frame within which an upper grill unit of the preferred embodiment is pivoted.
Figure 4:
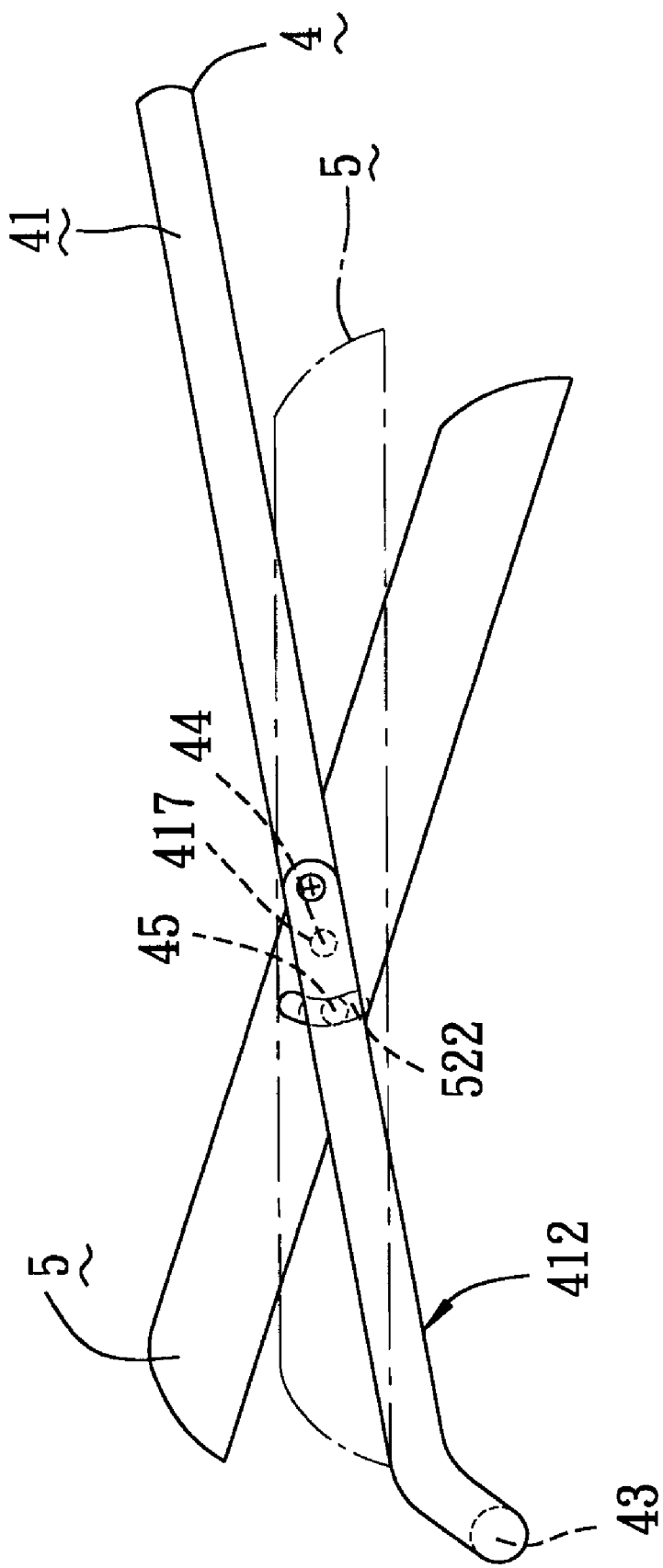
FIG. 4 is a schematic side view of the preferred embodiment, illustrating how the upper grill unit is pivotally connected to the frame of FIG. 3.

Referring to FIGS. 2 to 4, the preferred embodiment of a grill device of the present invention is shown to include a horizontal lower grill unit 3, a U-shaped frame 4, a horizontal upper grill unit 5, and a control switch 33.

As illustrated, the lower grill unit 3 has a rear side 34, and a top 31 that is provided with a lower cooking member 32.

The frame 4 is pivoted to the rear side 34 of the lower grill unit 3, and is movable rearward relative to the lower grill unit 3 between a closed position, where the frame 4 is superposed on a periphery of the lower grill unit 3, and an open position, where the frame 4 is spaced apart from the lower grill unit 3. The frame 4 includes a transverse arm 42, and two parallel lateral arms 41 which extend from two opposite ends of the transverse arm 42 to define a receiving space for confining the lower cooking member 32 when the frame 4 is at the closed position.

Figure 5:
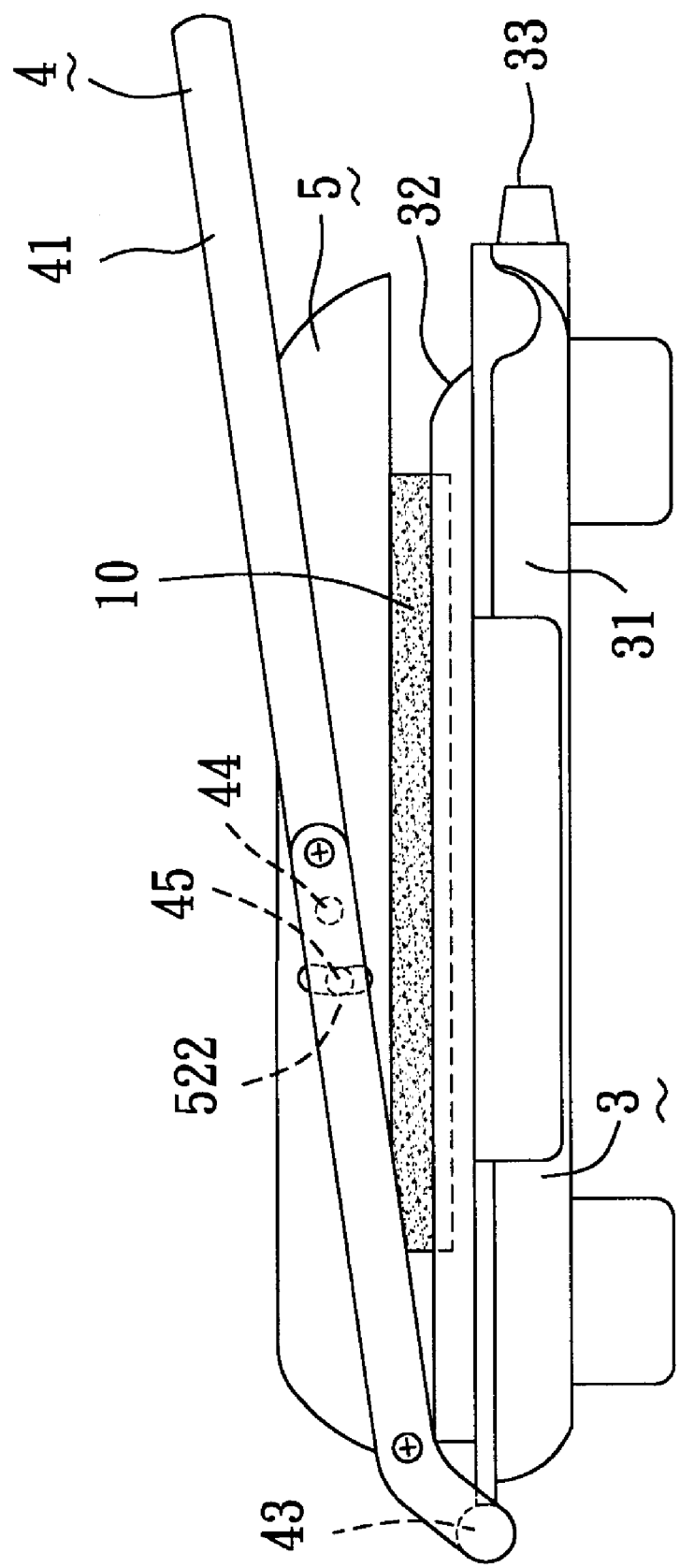
FIG. 5 is a schematic view of the preferred embodiment in use.

The horizontal upper grill unit 5 is disposed in the receiving space and is pivoted to the lateral arms 41 of the frame 4 via two pivots 44 so as to be turnable relative to the frame 4, as best shown in FIG. 4. The upper grill unit 5 has an upper cooking member 51 which is registered with and which is electrically coupled to the lower cooking member 32 of the lower grill unit 3, and which cooperates with the lower grill unit 3 to confine a cooking space therebetween when the frame 4 is at the closed position, as best shown in FIG. 5.

The control switch 33 is operable so as to control actuation and cooking temperature of the lower cooking member 32 of the lower grill unit 3 and the upper cooking member 51 of the upper grill unit 5. In this embodiment, the control switch 33 is mounted on the lower grill unit 3 and is provided with a temperature control knob, actuation of which can raise or lower the cooking temperature of the upper and lower cooking members 51, 32.

Preferably, the upper grill unit 5 includes a rectangular grill housing 52 within which the upper cooking member 51 is fixed and which has two lateral walls 520 disposed inboard to and extending parallel to the lateral arms 41 of the frame 4, and two pivot holes 521 which are respectively formed through the lateral walls 520 and which permit extension of the pivots 44 therethrough. The grill housing 52 further has a pair of cable-extension slots 522 which are formed through the lateral walls 520 respectively adjacent to the pivot holes 521. The lateral arms 41 of the frame 4 has two proximate arm sections 412 defining two cable-retention chambers 415 therein. Two connecting cables 46 are disposed in the cable-retention chambers 415 respectively, and extend through the slots 522 in the grill housing 52 via two tubular sleeves 45 for electrically connecting the upper and lower cooking members 51,32 and for restricting the extent of pivotal action of the upper grill unit 5 relative to the frame 4. Each of the proximate arm sections 412 is constituted by a base side wall 413, a peripheral wall 416 extending from the base side wall 413 to define the cable-retention chamber 415, and a cover plate 414 which is detachably mounted on the peripheral wall 413 by screws. Preferably, the base side wall 413 is formed with a pivot-mounting hole 417 to receive the pivot 44 therein, and a sleeve-mounting hole 418 to receive the tubular sleeve 45.

Referring again to FIG. 5, in case a relatively thick meat piece 10 is being grilled between the upper and lower cooking members 51,32, the upper cooking member 51 automatically adjusts by virtue of its pivotal connection to the frame 4 so as to be able to abut entirely against an upper grilling surface of the meat piece 10. Under this condition, the upper and lower grilling surfaces of the meat piece 10 will be fully and properly grilled after the required grilling period.

With this invention thus explained, it is apparent that numerous modifications and variations can be made without departing from the scope and spirit of this invention. It is therefore intended that this invention be limited only as indicated in the appended claims.

I claim:

1. A grill device comprising:

a horizontal lower grill unit having a rear side and provided with a lower cooking member;

a frame pivoted to said rear side of said lower grill unit and movable rearward relative to said lower grill unit between a closed position, where said frame is superposed on a periphery of said lower grill unit, and an open position, where said frame is spaced apart from said lower grill unit, said frame having at least two parallel lateral arms defining therebetween a receiving space and confining said lower cooking member therebetween when said frame is at said closed position;

a horizontal upper grill unit disposed in said receiving space and pivoted to said lateral arms of said frame via two pivots so as to be turnable relative to said frame, said upper grill unit having an upper cooking member which is registered with and which is electrically coupled to said lower cooking member of said lower grill unit, and cooperating with said lower grill unit to confine a cooking space therebetween when said frame is at said closed position; and a control switch operable so as to control actuation and cooking temperature of said lower cooking member of said lower grill unit and said upper cooking member of said upper grill unit.

2. The grill device as defined in claim 1, wherein said upper grill unit includes a rectangular grill housing within which said upper cooking member is fixed and which has two lateral walls disposed inboard to and extending parallel to said lateral arms of said frame, and two pivot holes which are respectively formed through said lateral walls and which permit extension of said pivots therethrough.

3. The grill device as defined in claim 2, wherein said grill housing further has a pair of cable-extension slots which are formed through said lateral walls, said lateral arms of said frame defining two cable-retention chambers therein, said grill device further comprising a pair of connecting cables which are disposed in said cable-retention chambers respectively and which extend through said slots in said grill housing for electrically connecting said upper and lower cooking members and for restricting the extent of pivotal action of said upper grill unit relative to said frame.

4. The grill device as defined in claim 3, further comprising two tubular sleeves respectively sleeved around said connecting cables and extending through said slots in said grill housing.

* * * * *